Aug. 10, 1954     S. NATELSON     2,685,800

PIPET FOR MICROANALYSIS

Filed Nov. 12, 1952

INVENTOR.
SAMUEL NATELSON
BY
ATTORNEY

Patented Aug. 10, 1954

2,685,800

UNITED STATES PATENT OFFICE 2,685,800

PIPET FOR MICROANALYSIS

Samuel Natelson, Rockford, Ill., assignor to Kopp Scientific, Inc., New York, N. Y., a corporation of New York Application November 12, 1952, Serial No. 319,865

9 Claims. (Cl. 73—425.4)

The present invention is directed to pipets, more particularly to a structure which is especially adapted for use in connection with micro analysis of liquids such as of blood taken in connection with medical examinations.

Such methods of examination have been known and used for some years and it has been recognized that the accuracy is dependent essentially on the accuracy with which the original sample of blood or the like is obtained. Such sample has been taken in pipets and the volumes to be measured thereby are of the order of .01 ml. and it is highly desirable that the accuracy of the measurement be of the order of 1% plus or minus.

Among the pipets previously used was the constriction type which is made by heating a capillary tube until the tube partially collapses, with the purpose of forming a point of lesser diameter. Thereby it is intended that after the liquid has been drawn into the tube beyond the point of constriction, it may be blown forward gently until increased resistance to the flow thereof is obtained at the point of constriction. Thereafter the tip of the tube is wiped off and the contents expelled by blowing more vigorously. In actual practice it was quite difficult to obtain a sharp constriction in the tube as the heating thereof softened a considerable length thereof, with a gradual tapering of the bore of the tube. It was practically impossible to obtain a V-shaped constriction. As a result, the operator had to more or less estimate the point to be chosen since increased resistance was gradual, whereby considerable error in measurement resulted.

To overcome this objection a modified form of tube was used. It consisted of a thin walled tube which was heated and drawn to provide a constriction, which permitted the production of less gradual constrictions. However, as a result, the pipet was extremely fragile. Not only was the wall of the tube thin and weak but the constriction introduced a greater weakness, at which point the tube broke. Further, the point of maximum constriction still was a question of the judgment of the operator.

The present invention is intended and adapted to overcome the difficulties and disadvantages inherent in the production of constriction type pipets, it being among the objects of the present invention to provide a pipet of a capillary tube in which the constrictions are sharp and can be located with exactness.

It is also among the objects of the present invention to provide a pipet which is strong and is capable of considerable abuse without breaking and which is relatively simple to manufacture.

In practicing the present invention there is provided a capillary tube of a type well known on the market. In such tube the wall thickness is greater than the diameter of the bore, being usually from 3 to 10 times said diameter. Such a piece of tubing is drawn down to decrease the wall thickness and to form a tip without substantially decreasing the bore. This is done by blowing a small bulb in the tube before drawing out.

In order to provide a constricted area within the tube, there is provided a short piece of glass which is of such size that it may be introduced into the bore of the tube and touch the inner wall thereof at one or more points. The cross-sectional area of the short piece of glass is less than the cross-sectional area of the bore. The size and shape of said piece is selected so as to give the desired ratio of cross-sectional areas of the piece relative to the bore. In order to attach the piece to the wall it is introduced into the capillary tube up to the desired point. Then the tube is heated at said point from the outside sufficiently to soften the glass of the tube and cause the piece to adhere thereto, or to wedge the piece of glass inserted in the tube so that it cannot move.

In the accompanying drawing constituting a part hereof and in which like reference characters indicate like parts, Fig. 1 is a longitudinal cross-sectional view of a capillary tube in the first stage of the operation of forming a constriction pipet;

Figure 1:
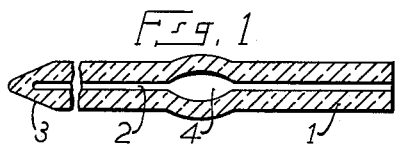
Figure 2:
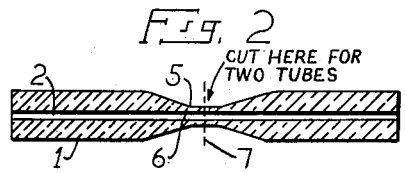
Fig. 2 is a similar cross-sectional view of the capillary tube at the next stage of the operation.

There is provided a capillary tube 1 of substantial length, having a bore 2 therethrough; the end 3 thereof is fused to close the bore and an intermediate portion 4 is heated and blown to give a bulb, the wall thickness of which is substantially less than the wall thickness of the tube 1.

Then bulb 4 is drawn out while in a plastic condition to form a tip 5 having a bore 6 of the same order as bore 2. Two such tubes are made simultaneously by cutting at 7.

Figure 3:
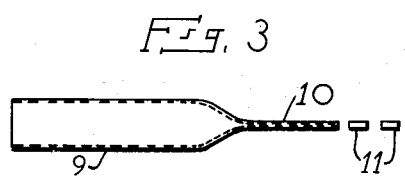
Fig. 3 is an elevational view of a piece of ordinary tubing from which the short piece of glass for forming the constriction is made.

Looking at Fig. 3, there is provided a tube 9 of glass, having a usual wall thickness. It is drawn out to form an extension 10, the diameter of which is slightly less than the diameter of bore 2. From the end of extension 10, short pieces 11 are cut off in the usual manner as by scratching with a file and bending to break off the pieces 11.

Figure 4:
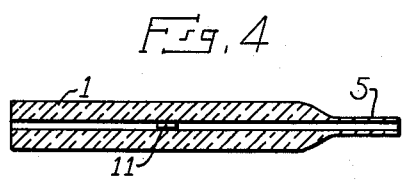
Fig. 4 is a cross-sectional view of a capillary tube with the short glass piece in place.

Then as shown in Fig. 4, a piece 11 is introduced into the end of the bore up to a predetermined point and the tube is heated sufficiently to cause incipient fusion and a welding or wedging of piece 11 in tube 1.

The inside diameter of tube 1 ranges from .01 to 2.0 mm. The preferable range of diameters is from 0.4 to 1.0 mm. and a diameter which has been found highly satisfactory is 0.5 mm. Tip 5 is from 2 to 3 cm. long and the internal diameter thereof is the same or slightly less than the diameter of bore 2. The outer diameter of tip 5 ranges from 0.7 to 0.9 mm. when the bore of tip 5 is 0.5 mm. Tube 9 is about 3 mm. in diameter and it is drawn down to a capillary tube, the bore of which is slightly less than the inner diameter 2. Pieces 11 are from 1 to 2 mm. in length.

Figure 5:
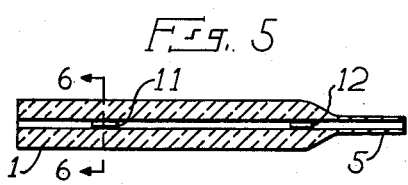
Fig. 5 is a view similar to Fig. 4 and having two constrictions therein.
Figure 6:
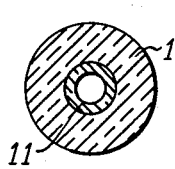
Fig. 6 is a transverse cross-sectional view taken along line 6—6 of Fig. 5.

In Fig. 5 there are provided two pieces 11 and 12 spaced a predetermined distance apart. This may be accomplished by introducing piece 12, for example, into tube 1 and fusing it in position. Then one may estimate the desired volume and introduce piece 11 so that the portion of tube 1 between pieces 11 and 12 has approximately the desired volume. Then piece 11 is fused into position. The pipet is then calibrated as a mark-to-mark pipet.

The calibration of the pipets of Figs. 4 and 5 may be made as follows: Draw approximately 100 mg. of mercury into the pipet. Mark with marking crayon, the point to which the meniscus of mercury has been drawn. Draw the mercury back to a uniform part of the tube and measure its length with calipers or centimeter ruler. Now blow the mercury out into a tared watch glass and weigh. Assuming the weight of the mercury is 100 mg. and its length L, then for 0.01 ml. (135.5 mg.) its length should be $135.5/100 \times L$ in the uniform part of the tube. The difference between this calculated length and the measured length is the length which has to be added to the mark made when the mercury extended to the tip, since the meniscus was in the uniform part of the tube. Measuring from the original mark, this difference is added and a new mark made to which the constriction cylinder is pushed. After the constriction cylinder is sealed in place the pipet is calibrated by delivering from it 0.1 N Nacl standard and titrated in the Rehberg buret with standardized 0.005 N mercuric nitrate. The pipet may also be standardized colorimetrically by delivering from it phenolsulfonphthalein (PSP 6 mg./ml.), diluting to 2 ml. and comparing the color with PSP diluted 1:200, in the Klett-Summerson colorimeter employing the 54 filter.

For mark-to-mark pipets the length of a mercury column weighing 135.5 mg. is determined as above, placing the constriction cylinders this distance apart. Make the tip at a suitable point by blowing out a bulb and drawing out as described. In this pipet the tip is made as close as possible to one of the constriction cylinder to minimize holdback. This pipet is calibrated in the same manner as the constriction type.

Figure 7:
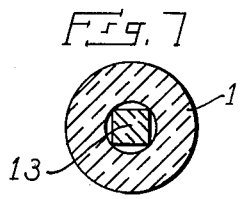

In Fig. 7 there is shown a different form of the piece for forming the constriction within the capillary tube. There is provided a square bar 13 of such size that the distance between opposite corners thereof is slightly less than bore 2. A suitable piece is cut from the bar and it is slipped into place within bore 2. Heat is applied to tube 1 sufficiently so that the corners of piece 13 are fused to the wall thereof.

Figure 11:
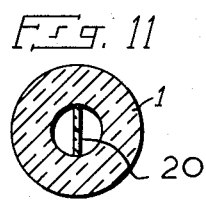
Figs. 7, 8, 9, 10 and 11 are views similar to Fig. 6 and illustrating various forms of constriction pieces which may be used in accordance with the present invention.
Figure 8:
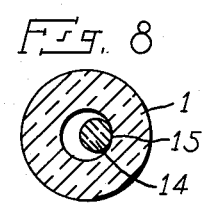
Figure 9:
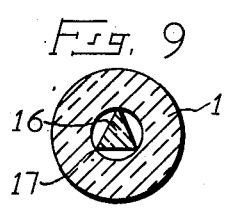
Figure 10:
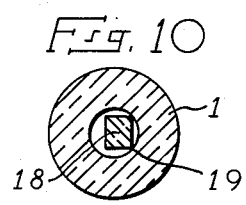

In Fig. 8 there is shown a piece 14 of a circular rod of lesser diameter than bore 2 which is fused to the wall of the capillary tube along a line 15. In Fig. 9 there is provided a triangular rod 16, the three edges 17 of which are fused onto the wall of tube 1. In Fig. 10 there is shown a rectangular tube 18, two of the edges 19 of which contact with the wall of tube 1 and are wedged thereto. In Fig. 11 a flat piece or ribbon 20 of glass has been inserted and wedged into the tube to produce the constriction.

It has been found that tubes made in accordance with the present invention are easily made from standard materials readily available on the market. They can be calibrated to great accuracy and are so rugged that they may be used for a long time before breakage occurs. They are especially useful in micro analysis of blood specimens. One important application thereof is in the analysis of blood taken from the finger tip or heel of infants, and particularly premature infants, where it is desired to make a complete analysis of the blood, using a minimum quantity thereof. It is also useful in connection with blood analysis from individuals who suffer from severe burns and where the few available veins must be reserved for administration of fluids. The pipet has also been successfully used in patients suffering from severe edema, extensive thrombosis, excessive obesity, in whom the performance of daily venipuncture is difficult. In all these cases it is a simple matter to draw blood from the finger tip or heel without disturbance of the patient and the small amount of blood so obtained is sufficient for ultramicro analysis by the use of the present invention.

The abrupt change of bore at the surface of the piece of glass used in the constriction makes for a sharp change in resistance, when delivering a sample from the pipet, which is unmistakable to the operator and which makes the pipet very precise. For larger volumes a bulb is blown between the constriction and the tip which permits measurement of the desired volume (i. e. 0. 1 ml.) with an accuracy not attainable with conventional macro pipets for measuring 1.0 ml.

Although the invention has been described by several specific embodiments, it would be apparent to those skilled in the art that the various forms of the invention illustrate the scope thereof and do not limit the same. For instance, it is preferred to use pyrex glass for the several elements but other types of glass or even in some cases synthetic plastic materials may be used. The wall thickness of tubes 1 and 9 may be different from those specifically described. Other forms of constriction pieces may be utilized, it being important that the cross-sectional area thereof be a sufficient proportion of the cross-section of the bore to give a noticeable resistance to the blowing by the operator. While the pipets shown in Figs. 4 and 5 are simple, straight pipets, the invention is equally applicable to pipets of other configurations such as those having bulbs therein.

I claim:

1. A constriction pipet comprising a capillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being attached to said wall.

2. A constriction pipet comprising a capillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being a thin-walled tube contacting the wall of said bore and fused to said wall.

3. A constriction pipet comprising a cipillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being angular in cross-section and contacting the wall of said bore at a plurality of points.

4. A constriction pipet comprising a capillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being a substantially flat ribbon contacting the wall of said bore at a plurality of points.

5. A constriction pipet comprising a capillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being a solid rod contacting the wall of said bore at at least one point.

6. A constriction pipet comprising a capillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being fused to said wall at the point of contact with said wall.

7. A constriction pipet comprising a capillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being attached to said wall, the inside diameter of said tube being about 0.01 to 2.0 mm.

8. A constriction pipet comprising a capillary tube the wall thickness of which is substantially greater than the bore thereof, one end of said pipet being drawn to a lesser outer diameter than said tube to form a tip, the bore being substantially uniform throughout its length, a relatively short piece of material in said bore and in contact with the wall thereof, the cross-sectional area of said piece being less than the cross-sectional area of said bore, said piece being attached to said wall, the inside diameter of said tube being about 0.01 to 2.0 mm. and said tip being 2 to 3 cm. long.

9. A constriction pipet comprising a capillary tube the wall thickness of which is substantially greater than the bore thereof, one end of said pipet being drawn to a lesser outer diameter than said tube, the bore being substantially uniform throughout its length, a relatively short piece of material in said bore and in contact with the wall thereof, the cross-sectional area of said piece being less than the cross-sectional area of said bore, said piece being attached to said wall, said piece being 1 to 2 mm. long.

References Cited in the file of this patent

UNITED STATES PATENTS

| Number | Name | Date |
| --- | --- | --- |
| 2,104,325 | Juffa | Jan. 4, 1938 |
| 2,237,213 | Brown | Apr. 1, 1941 |
| 2,423,173 | Brady et al. | July 1, 1947 |